(12) United States Patent
Wang et al.

(10) Patent No.: US 10,684,731 B2
(45) Date of Patent: Jun. 16, 2020

(54) TOUCH APPARATUS AND SENSING METHOD AND TOUCH SENSING CIRCUIT THEREOF

(71) Applicant: HIMAX TECHNOLOGIES LIMITED, Tainan (TW)

(72) Inventors: Wei-Song Wang, Tainan (TW); Yaw-Guang Chang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 15/667,636

(22) Filed: Aug. 3, 2017

(65) Prior Publication Data

US 2019/0042016 A1 Feb. 7, 2019

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 3/0418* (2013.01); *G06F 2203/04104* (2013.01)

(58) Field of Classification Search
CPC ...... G06F 3/044; G06F 3/0416; G06F 3/0418; H03K 2217/960705
See application file for complete search history.

(56) References Cited

U.S. PATENT DOCUMENTS

| | | | | |
|---|---|---|---|---|
| 8,982,097 | B1* | 3/2015 | Kuzo | G06F 3/0418 |
| | | | | 345/174 |
| 2014/0152621 | A1* | 6/2014 | Okayama | G06F 3/0416 |
| | | | | 345/174 |
| 2015/0042600 | A1* | 2/2015 | Lukanc | G06F 3/0412 |
| | | | | 345/174 |
| 2015/0049044 | A1* | 2/2015 | Yousefpor | G06F 3/044 |
| | | | | 345/174 |
| 2017/0269773 | A1* | 9/2017 | Suzuki | G06F 3/0416 |
| 2018/0307368 | A1* | 10/2018 | Koide | G02F 1/13338 |

FOREIGN PATENT DOCUMENTS

| | | |
|---|---|---|
| CN | 103995626 | 8/2014 |
| CN | 104063101 | 9/2014 |
| TW | 201344594 | 11/2013 |
| TW | 201636790 | 10/2016 |

* cited by examiner

*Primary Examiner* — Yuzhen Shen
(74) *Attorney, Agent, or Firm* — JCIPRNET

(57) ABSTRACT

A touch apparatus and a sensing method and a touch sensing circuit thereof are provided. The touch apparatus includes a touch panel and the touch sensing circuit. In a first period, the touch sensing circuit applies the same driving signal to a plurality of sensing electrodes of the touch panel at the same time, and performs self-capacitance touch detection on the sensing electrodes to obtain a self-capacitance detection result. In a second period, the touch sensing circuit performs mutual-capacitance touch detection on at least one of the sensing electrodes to obtain a mutual-capacitance detection result. The touch sensing circuit determines whether a touch event of the touch panel is triggered by water based on the mutual-capacitance detection result and the self-capacitance detection result.

15 Claims, 7 Drawing Sheets

TOUCH APPARATUS AND SENSING METHOD AND TOUCH SENSING CIRCUIT THEREOF

BACKGROUND OF THE INVENTION

1. Field of the Invention

The invention relates to touch sensing, and particularly relates to a touch apparatus, a sensing method thereof, and a touch sensing circuit thereof.

2. Description of Related Art

In the applications of in-cell touch sensing, a common electrode layer (VCOM layer) of a display is adopted as the touch sensing electrode. The common electrode layer is divided into a plurality of blocks (i.e., a plurality of sensing electrodes) to position a location of a touch event. The common electrode layer needs to be coupled to a common voltage during a display driving period to ensure the pixel crystal is operated at a connect voltage. During a touch sensing period, the common electrode layer is coupled to a touch sensing circuit to sense a touch. Generally, in addition to the common electrode layer, the display panel may further include data lines (also referred to as source lines) and scan lines (also referred to as gate lines). Therefore, parasitic capacitances may be generated between the common electrode layer and the data lines and between the common electrode layer and the scan lines. When the common electrode layer perform touch sensing, the parasitic capacitances may affect a capacitance value of the common electrode layer (sensing electrodes). In order to reduce influences of the parasitic capacitances on touch sensing, in addition to applying a driving signal to a target sensing electrode (also referred to as a target common electrode), the same driving signal is also applied to the data lines and the scan lines during a touch sensing period, thereby eliminating the parasitic capacitances between VCOM and the data lines and VCOM and the scan lines.

In order to prevent an erroneous touch, when the touch sensing circuit detects a large-area touch event, a conventional touch sensing circuit tends to ignore such large-area touch event. In other words, the touch sensing circuit does not report the location of the large-area touch event to the processor. In an actual scenario of using a touch, it is common to perform a touch operation on an in-cell touch display panel with a wet finger. If there is a greater amount of water, the water from the wet finger may take up a large area on the in-cell touch display panel. The conventional touch sensing circuit is unable to tell the difference between the large-area touch event resulting from an erroneous touch and the large-area touch event resulting from the wet finger. The large-area touch event resulting from the wet finger is normally a meaningful operation behavior of the user, but the conventional touch sensing circuit usually treats the touch event triggered by the wet finger as an erroneous touch and ignores the touch event of the wet finger.

SUMMARY OF THE INVENTION

The invention provides a touch apparatus, a sensing method of the touch apparatus, and a touch sensing circuit of the touch apparatus capable of determining whether a touch event is triggered by water.

An embodiment of the invention provides a touch apparatus. The touch apparatus includes a touch panel and the touch sensing circuit. The touch panel has a plurality of sensing electrodes to sense a touch event. The touch sensing circuit is coupled to the touch panel to read sensing information of the sensing electrodes. In a first period, the touch sensing circuit applies the same driving signal to the sensing electrodes at the same time, and the touch sensing circuit performs self-capacitance touch detection on the sensing electrodes to obtain a self-capacitance detection result. In a second period, the touch sensing circuit performs mutual-capacitance touch detection on at least one sensing electrode of the sensing electrodes to obtain a mutual-capacitance detection result. The touch sensing circuit determines whether the touch event is triggered by water based on the mutual-capacitance detection result and the self-capacitance detection result.

An embodiment of the invention provides a sensing method of a touch apparatus. The sensing method includes: applying the same driving signal to a plurality of sensing electrodes of the touch panel at the same tune by a touch sensing circuit and performing self-capacitance touch detection on the touch sensing electrodes to obtain a self-capacitance detection result in a first period; performing mutual-capacitance touch detection on at least one sensing electrode of the sensing electrodes by the touch sensing circuit to obtain a mutual-capacitance detection result in a second period; and determining whether the touch event is triggered by water by the touch sensing circuit based on the mutual-capacitance detection result and the self-capacitance detection result.

An embodiment of the invention provides a touch sensing circuit for reading sensing information of a plurality of sensing electrodes of a touch panel. In a first period, the touch sensing circuit applies the same driving signal to the sensing electrodes at the same time and performs self-capacitance touch detection on the sensing electrodes to obtain a self-capacitance detection result. In a second period, the touch sensing circuit performs mutual-capacitance touch detection on at least one of the sensing electrodes to obtain a mutual-capacitance detection result. The touch sensing circuit determines whether a touch event of the touch panel is triggered by water based on the mutual-capacitance detection result and the self-capacitance detection result.

Based on the above, in the touch apparatus, the sensing method of the touch apparatus, and the touch sensing circuit of the touch apparatus according to the embodiments of the invention, the self-capacitance touch detection and the mutual-capacitance touch detection are performed on the sensing electrodes. The touch sensing circuit determines whether the touch event is triggered by water based on the mutual-capacitance detection result and the self-capacitance detection result. Consequently, the touch event triggered by the wet finger is not misidentified as a large-area touch event triggered by an erroneous touch.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
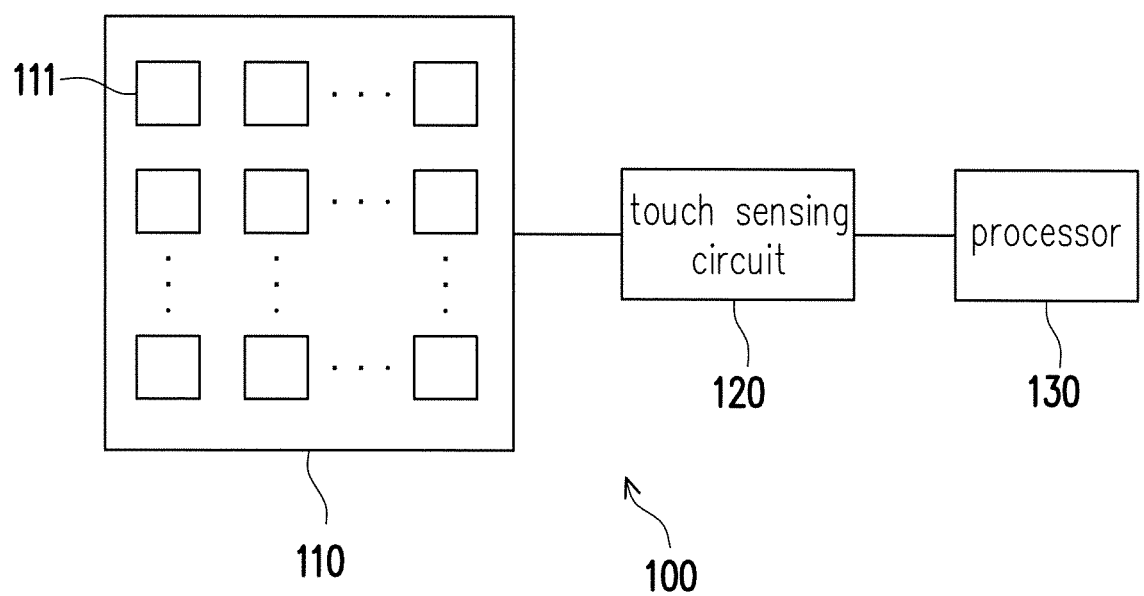
FIG. 1 is a schematic circuit block diagram illustrating a touch apparatus according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

The term "couple" used throughout the specification (including the claims) refers to any direct and indirect connections. For instance, if a first device is described to be coupled to a second device, it is interpreted as that the first device is directly coupled to the second device, or the first device is indirectly coupled to the second device through other devices or connection means. Moreover, wherever possible, components/members/steps using the same referral numerals in the drawings and description refer to the same or like parts. Components/members/steps using the same referral numerals or using the same terms in different embodiments may cross-refer related descriptions.

FIG. 1 is a schematic circuit block diagram illustrating a touch apparatus 100 according to an embodiment of the invention. Based on the design needs, the touch apparatus 100 may be a mobile phone, a tablet computer, a notebook computer, or other portable electronic apparatuses. In some other embodiments, the touch apparatus 100 may be an advertisement apparatus, a self-service vending machine, a public transportation inquiry machine, or other fixed electronic apparatuses. The touch apparatus 100 includes a touch panel 110, a touch sensing circuit 120, and a processor 130. The touch panel 110 has a plurality of sensing electrodes (such as sensing electrodes 111 shown in FIG. 1). The touch panel 110 may sense a touch event. Based on the design needs, the touch panel 110 may be any type of capacitive touch panel. For example, in some embodiments, the touch panel 110 may be an in-cell touch display panel, and the sensing electrodes (e.g., the sensing electrodes 111 shown in FIG. 1) in the touch panel 110 may be a plurality of common electrodes in the in-cell touch display panel. The common electrodes are also referred to as VCOM electrodes.

The touch sensing circuit 120 is coupled to the touch panel 110 to read sensing information of the sensing electrodes in the touch panel 110. Based on the design needs, the touch sensing circuit 120 includes an analog front end (AFE) circuit, an analog-to-digital converter circuit, a digital operational circuit, and/or other circuits/components. The analog front end circuit may be a conventional analog front end circuit or other reading circuits/components. The analog-to-digital converter circuit may be a conventional analog-to-digital converter circuit or other converter circuits/components. The digital operational circuit may be a microcontroller, a microprocessor, or other processing circuits/components.

The processor 130 is coupled to the touch sensing circuit 120 to receive a processing result (e.g., location information of a touch event) of the touch sensing circuit 120. In some embodiments, the processor 130 may be a central processing unit (CPU) operating an operation system (OS). In some other embodiments, the processor 130 may be a microcontroller, a microprocessor, an application-specific integrated circuit (ASIC), a digital signal processor (DSP), a field programmable gate array (FPGA), and/or other processing circuits/components.

Figure 2:
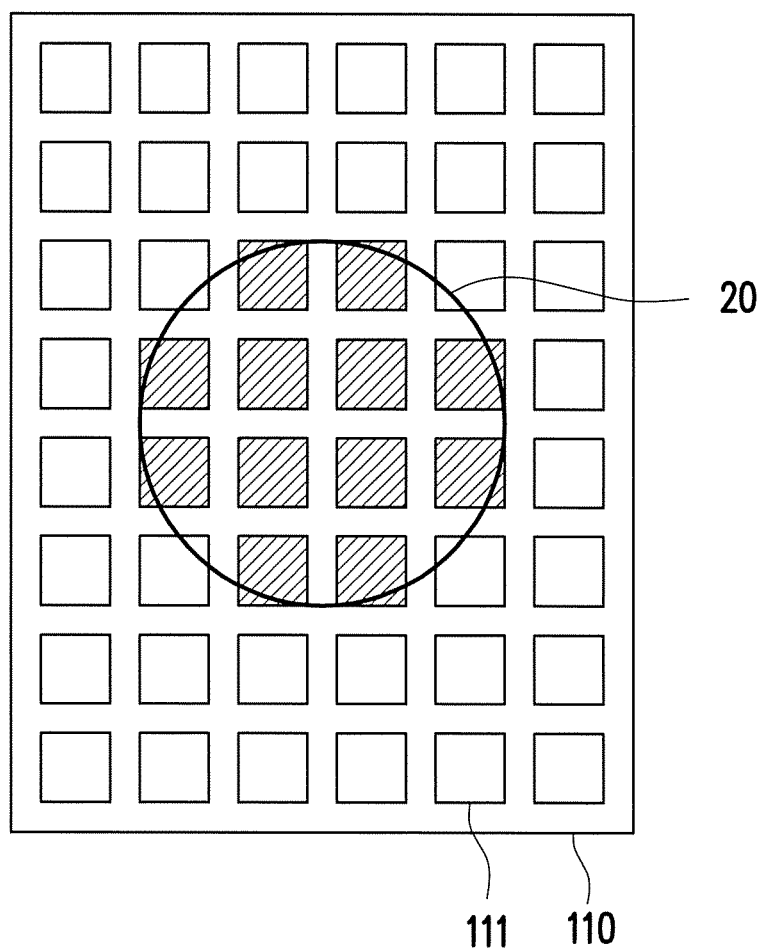
FIG. 2 is a schematic view illustrating a scenario of a touch event of a touch panel shown in FIG. 1 according to an embodiment of the invention.

FIG. 2 is a schematic view illustrating another scenario of a touch event of the touch panel 110 shown in FIG. 1 according to an embodiment of the invention. The touch sensing circuit 120 may apply the same driving signal to the sensing electrodes (e.g., the sensing electrodes 111) in the touch panel 110 at the same time, and the touch sensing circuit 120 may perform self-capacitance touch detection on the sensing electrodes. Therefore, when a large-area object 20 (e.g., a palm) contacts the touch panel 110, the touch sensing circuit 120 may sense the large-area object 20 through one or more of the sensing electrodes overlapped with the large-area object 20. Since a contact area of the large-area object 20 on the touch panel 110 is greater than a threshold, the touch sensing circuit 120 may ignore a touch event triggered by the large-area object 20. In other words, the touch sensing circuit 120 does not report a location of the large-area object 20 to the processor 130. Therefore, the touch sensing circuit 120 is capable of avoiding an erroneous touch.

Figure 3:
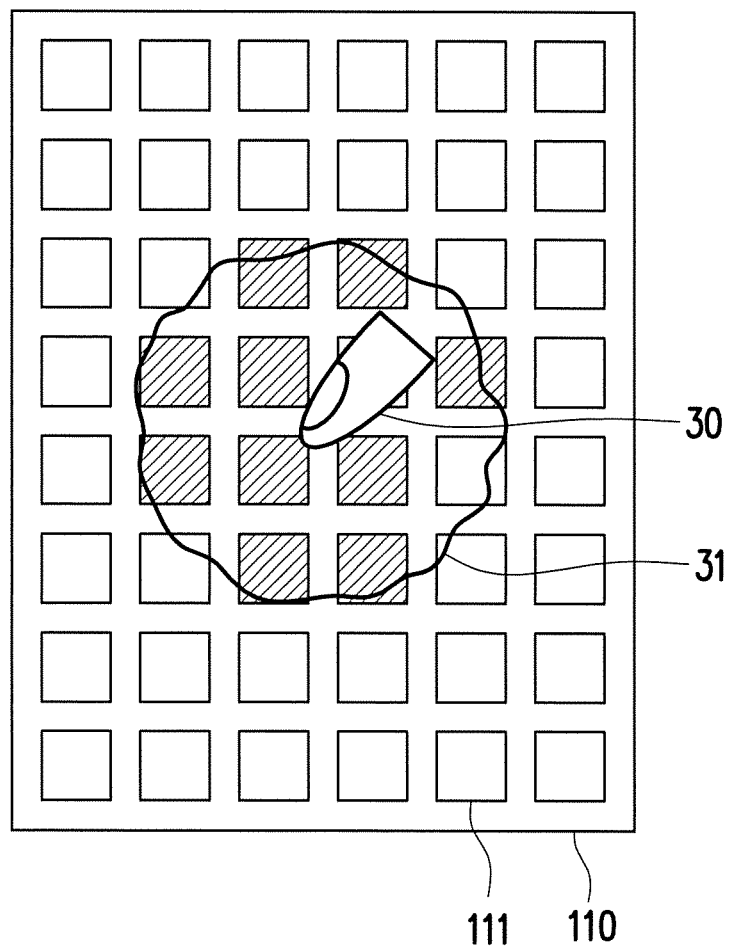
FIG. 3 is a schematic view illustrating another scenario of a touch event of the touch panel shown in FIG. 1 according to an embodiment of the invention.

FIG. 3 is a schematic view illustrating another scenario of a touch event of the touch panel 110 shown in FIG. 1 according to an embodiment of the invention. It is a common scenario of actual use of a touch that a touch operation is performed on the touch panel 110 with a wet finger 30. If there is a greater amount of water 31, the water 31 from the wet finger 30 may take up a large area on the touch panel 110, as shown in FIG. 3. If the touch sensing circuit 120 is unable to tell whether an object on the touch panel 110 is the water 31, the touch sensing circuit 120 may consider a touch event triggered by the wet finger 30 as an erroneous touch and ignore the touch event of the wet finger. However, a large-area touch event triggered by the wet finger 30 is usually a meaningful operation behavior of the user, instead of an erroneous touch. Therefore, the touch sensing circuit 120 may adopt a sensing method to determine whether the touch event is triggered by the water 31. When the touch sensing circuit 120 is able to tell that the touch event is triggered by the water 31, the touch sensing circuit 120 may report a location of the water 31 (i.e., a location of the wet finger 30) to the processor 130.

Figure 4:
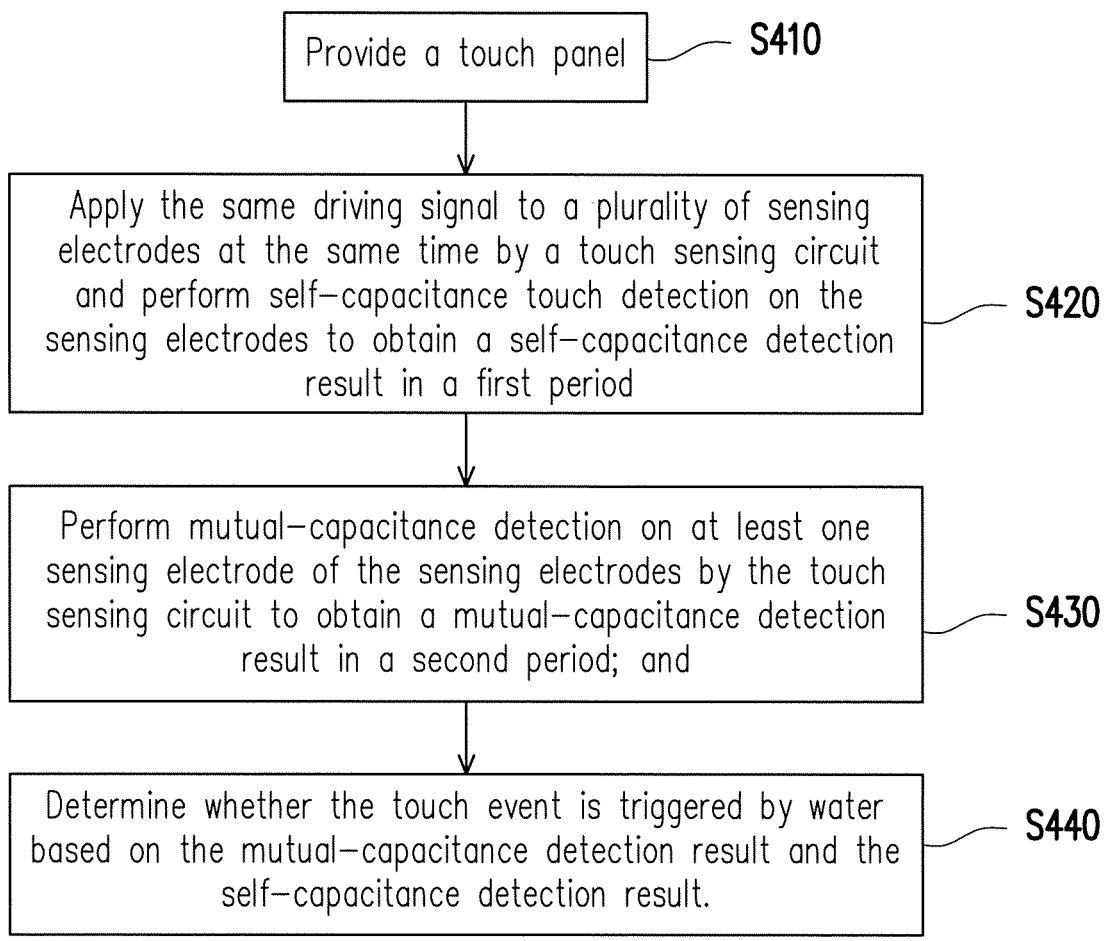
FIG. 4 is a schematic flowchart illustrating a sensing method of a touch apparatus according to an embodiment of the invention.

FIG. 4 is a schematic flowchart illustrating a sensing method of the touch apparatus 100 according to an embodiment of the invention. The sensing method shown in FIG. 4 includes Step S410, Step S420, Step S430, and Step S440.

It should be noted that the order of Steps S410 to S440 shown in FIG. 4 is merely described as an exemplary embodiment, and such order shall not be considered as mandatory. For example, in other embodiments, Step S420 and Step S430 shown in FIG. 4 may be performed in a switched order. In other words, Step S430 may be performed first, and then Step S420 is performed.

Referring to FIGS. 1 and 4, at Step S410, the touch panel 110 is provided to sense a touch event. In a first period (Step S420), the touch sensing circuit 120 may apply the same driving signal to the sensing electrodes (e.g., the sensing electrodes 111) in the touch panel 110 at the same time, and performs a self-capacitance touch detection on the sensing electrodes to obtain a self-capacitance detection result.

Figure 5:
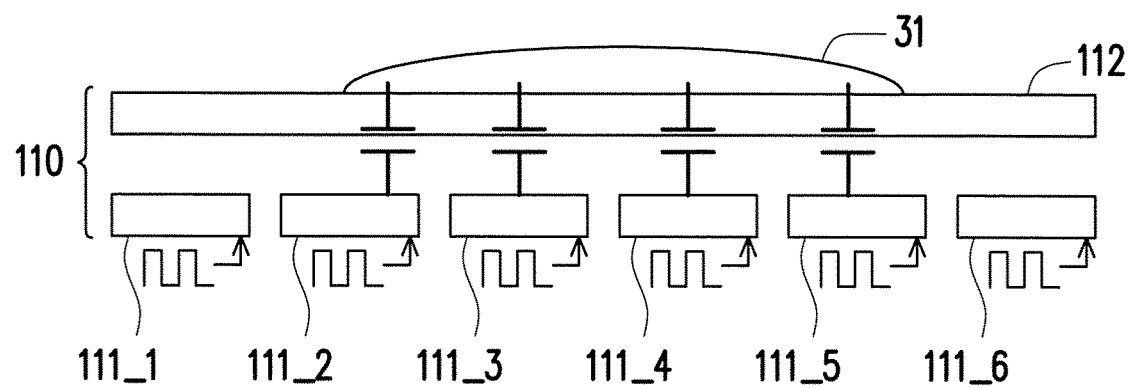
FIG. 5 is a schematic view illustrating a scenario where the touch panel shown in FIG. 1 performs self-capacitance touch detection according to an embodiment of the invention.

FIG. 5 is a schematic view illustrating a scenario where the touch panel 110 shown in FIG. 1 performs the self-capacitance touch detection according to an embodiment of the invention. FIG. 5 illustrates a schematic cross-sectional view of the touch panel 110, and the touch panel 110 includes a sensing electrode 111_1, a sensing electrode 111_2, a sensing electrode 111_3, a sensing electrode 111_4, a sensing electrode 111_5, and a sensing electrode 111_6. The touch panel 110 has a cover layer 112 (e.g., a glass plate or other materials) for the user to actually touch. When the water 31 covers the touch panel 110, as shown in FIG. 5, a parasitic capacitance is formed between the water 31 and the sensing electrodes (e.g., the sensing electrodes 111_2 to 111_5 shown in FIG. 5). During the self-capacitance touch detection, in addition to applying a driving signal to a target sensing electrode (e.g., the sensing electrode 111_4 shown in FIG. 5), the same driving signal is also applied to the sensing electrodes that are not the target sensing electrode (i.e., the sensing electrodes currently not involved in sensing) at the same time to reduce the parasitic capacitance, as shown in FIG. 5. Based on the design needs, the self-capacitance touch detection may include a conventional self-capacitance touch detection operation or other self-capacitance touch detection operations. Thus, details in this regard will not be further described in the following.

However, when the self-capacitance touch detection is performed, since signals at two ends of the parasitic capacitance are in the same waveforms. Therefore, the parasitic capacitance is equivalent to non-existing. According to a charge equation $Q=C*V$, when a voltage difference between the two ends of the parasitic capacitance is 0, a charge quantity of the parasitic capacitance is $Q=C*0=0$. In other words, a capacitance value C of the parasitic capacitance is equivalent to 0. Hence, in the scenario shown in FIG. 5, the touch sensing circuit 120 is unable to tell that the water 31 is on the touch panel 110. In other words, the self-capacitance detection result indicates that no touch event occurs on the touch panel 110.

Referring to FIGS. 1 and 4, in a second period (Step S430), the touch sensing circuit 120 may perform mutual-capacitance touch detection on at least one target sensing electrode of the sensing electrodes of the touch panel 110 to obtain a mutual-capacitance detection result. In the mutual-capacitance touch detection, the target sensing electrode is coupled to the analog front end circuit of the touch sensing circuit 120, and a driving signal is applied to the rest of the sensing electrodes.

Figure 6:
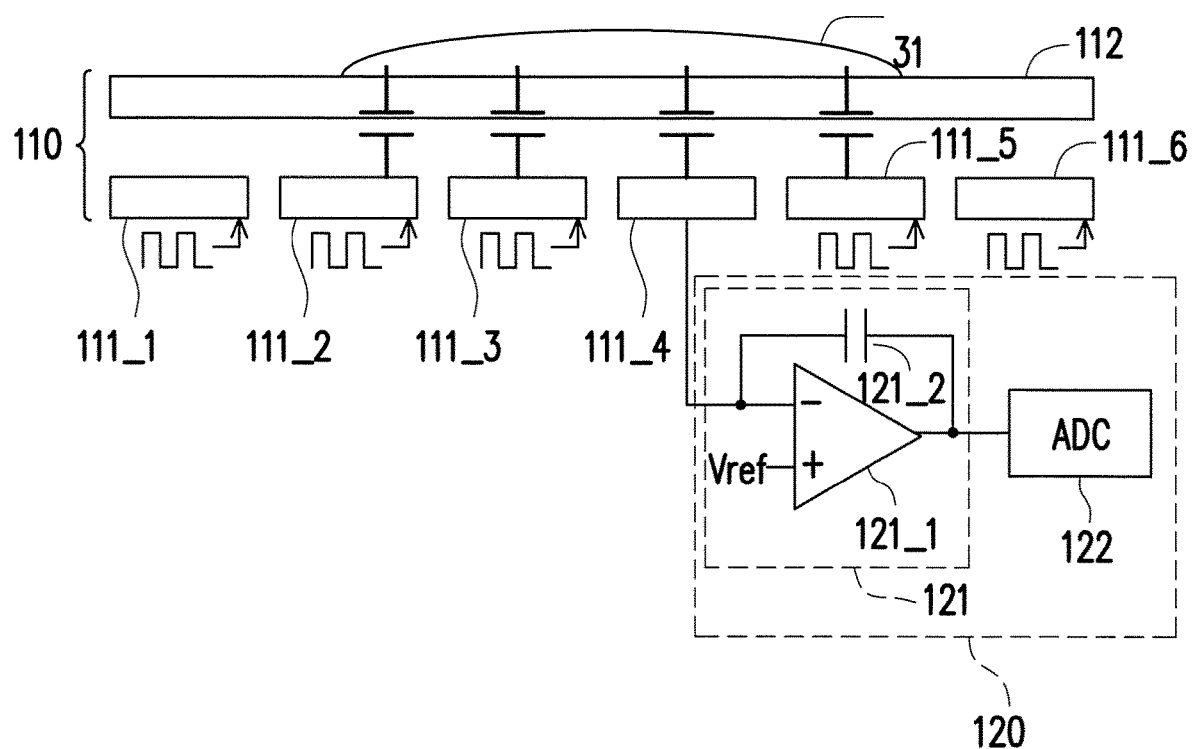
FIG. 6 is a schematic view illustrating a scenario where the touch panel shown in FIG. 1 performs mutual capacitance touch detection according to an embodiment of the invention.

FIG. 6 is a schematic view illustrating a scenario where the touch panel 110 shown in FIG. 1 performs the mutual-capacitance touch detection according to an embodiment of the invention. Details concerning the water 31, the touch panel 110, the sensing electrodes 111_1 to 111_6, and the cover layer 112 shown in FIG. 6 may be referred to relevant descriptions in FIG. 5, and thus will not be repeated in the following. In the embodiment shown in FIG. 6, the touch sensing circuit 120 includes an analog front end circuit 121, an analog-to-digital converter 122, and other circuits/components. An input end of the analog front end circuit 121 is coupled to an input end of the analog-to-digital converter 122. In the second period (Step S430), the touch sensing circuit 120 may perform the mutual-capacitance touch detection on at least one target sensing electrode (e.g., the sensing electrode 111_4) of the sensing electrodes of the touch panel 110 to obtain the mutual-capacitance detection result. In the mutual-capacitance touch detection, the target sensing electrode (e.g., the sensing electrode 111_4) is coupled to the analog front end circuit 121 of the touch sensing circuit 120, whereas a driving signal is applied to the rest of the sensing electrodes (e.g., the sensing electrode 111_1, the sensing electrode 111_2, the sensing electrode 111_3, the sensing electrode 111_5, and the sensing electrode 111_6). Based on the design needs, the mutual-capacitance touch detection may include a conventional mutual-capacitance touch detection operation or other mutual-capacitance detection operations. Thus, details in this regard will not be further described in the following. Therefore, the touch sensing circuit 120 may find that an object (i.e., the water 31) is on the touch panel 110 in the second period (i.e., the mutual-capacitance touch detection).

In the embodiment shown in FIG. 6, the analog front end circuit 121 includes an operational amplifier 121_1 and a capacitor 121_2. The operational amplifier 121_1 has an inverting input end, a non-inverting input end, and an output end. The inverting input end of the operational amplifier 121_1 is coupled to the target sensing electrode (e.g., the sensing electrode 111_4). A first end and a second end of the capacitor 121_2 are respectively coupled to the inverting input end and the output end of the operational amplifier 121_1. The output end of the operational amplifier 121_1 is coupled to the input end of the analog-to-digital converter 122. The non-inverting input end of the operational amplifier 121_1 is coupled to a reference voltage $V_{ref}$. In the second period (i.e., the period of the mutual-capacitance touch detection), the reference voltage $V_{ref}$ is a fixed voltage, and the analog front end circuit 121 may perform the mutual-capacitance touch detection on the target sensing electrode (e.g., the sensing electrode 111_4). In the first period (i.e., the period of the self-capacitance touch detection), the reference voltage $V_{ref}$ is a clock signal, and the analog front end circuit 121 may perform the self-capacitance touch detection on the target sensing electrode (e.g., the sensing electrode 111_4).

Referring to FIGS. 1 and 4, At Step S440, the touch sensing circuit 120 determines whether the touch event is triggered by the water 31 based on the mutual-capacitance detection result at Step S430 and the self-capacitance detection result at Step S420. For example, when the mutual-capacitance detection result at Step S430 indicates that a touch event occurs on the touch panel 110 (as described with reference to FIG. 6), but the self-capacitance detection result at Step S420 indicates that no touch event occurs on the touch panel (as described above with reference to FIG. 5), the touch sensing circuit 120 may determine that the touch event is triggered by the water 31.

Once it is found that the large-area touch event on the touch panel 110 is triggered by the water 31, the touch sensing circuit 120 may report a location of the large-area touch event to the processor 130. For example, when the touch sensing circuit 120 determines that the touch event is triggered by the water 31 at Step S440, and when the user is in contact with the water 31, the touch sensing circuit 120 may apply the same driving signal to the sensing electrodes at the same time, perform the self-capacitance touch detection on the sensing electrodes again to obtain a location of the water 31, and report the location of the water 31 to the processor 130. When the touch sensing circuit 120 determines that the touch event is not triggered by water, the touch sensing circuit 120 may ignore the large-area touch event. In other words, the touch sensing circuit 120 may refrain itself from reporting the location of the large-area touch event to the processor 130.

Figure 7:
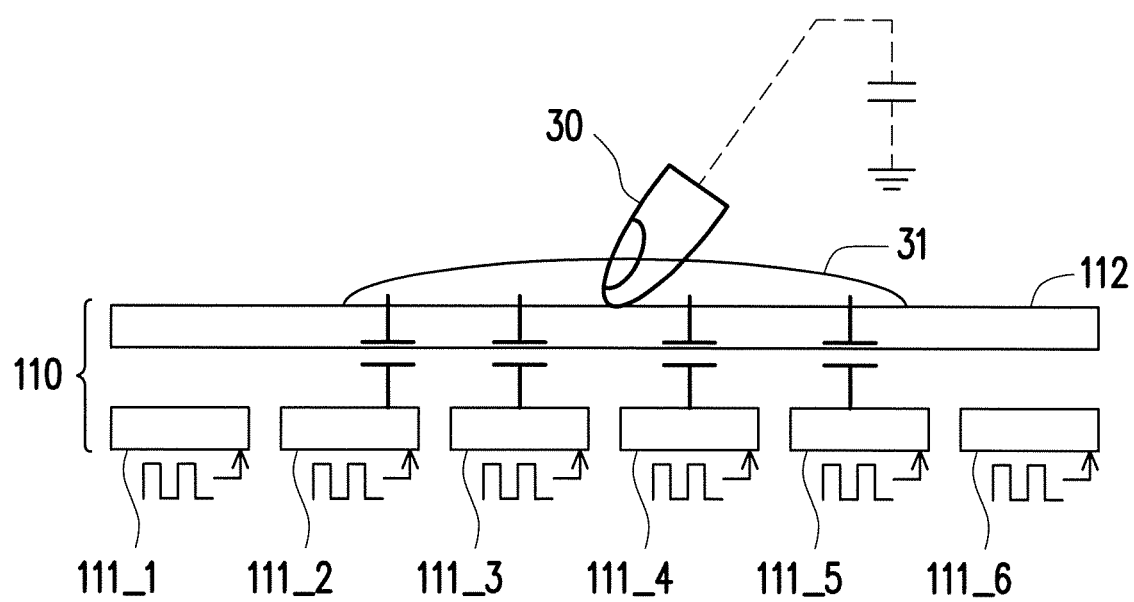
FIG. 7 is another schematic view illustrating a scenario where the touch panel shown in FIG. 1 performs self-capacitance touch detection according to an embodiment of the invention.

FIG. 7 is another schematic view illustrating a scenario where the touch panel 110 shown in FIG. 1 performs self-capacitance touch detection according to an embodiment of the invention. Details concerning the water 31, the touch panel 110, the sensing electrodes 111_1 to 111_6, and the cover layer 112 shown in FIG. 7 may be referred to relevant descriptions in FIG. 5, and thus will not be repeated in the following. In the scenario shown in FIG. 7, in addition to the water 31 contacting the touch panel 110, the wet finger 30 also contacts the touch panel 110. During the self-capacitance touch detection, in addition to applying a driving signal to the target sensing electrode (e.g., the sensing electrode 111_4 shown in FIG. 7), the same driving signal is also applied to the sensing electrodes that are not the target sensing electrode (i.e., the sensing electrodes currently not involved in sensing) at the same time to reduce the parasitic capacitance, as shown in FIG. 7. Details concerning the self-capacitance touch detection shown in FIG. 7 may be referred to relevant descriptions in FIG. 5, and thus not be repeated in the following. The wet finger 30 may apply a reference voltage to the water 31. In the scenario shown in FIG. 7, since signals at the two ends of the parasitic capacitance are in different waveforms, the touch sensing circuit 120 is able to sense the parasitic capacitance, thereby sensing the location of the water 31. Then, the touch sensing circuit 120 may report the location of the water 31 to the processor 130.

Figure 8:
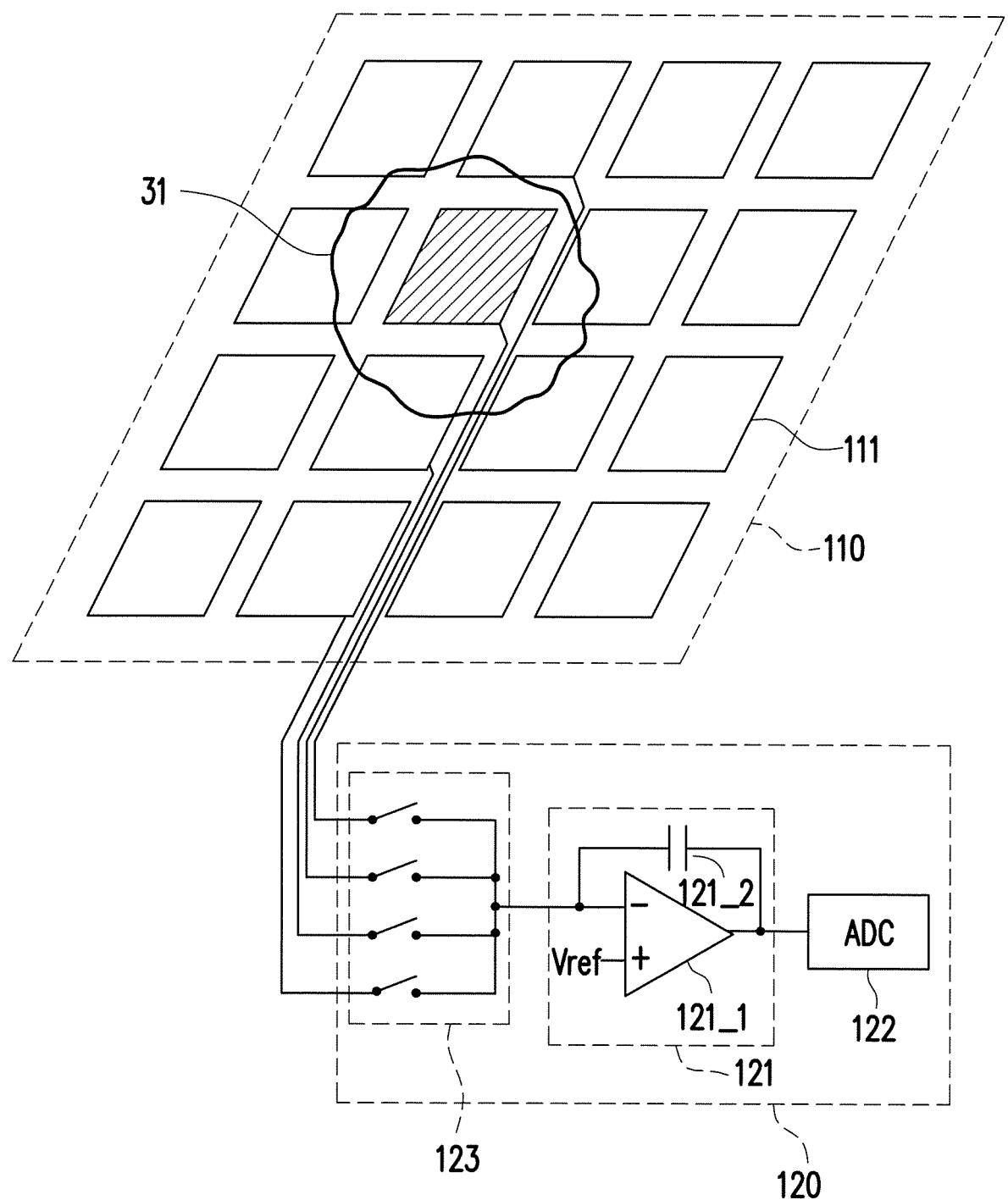
FIG. 8 is a schematic circuit block diagram illustrating a touch sensing circuit shown in FIG. 1 according to an embodiment of the invention.

FIG. 8 is a schematic circuit block diagram illustrating the touch sensing circuit 120 shown in FIG. 1 according to an embodiment of the invention. In the embodiment shown in FIG. 8, the touch sensing circuit 120 includes the analog front end circuit 121, the analog-to-digital converter 122, and a switch circuit 123. The switch circuit 123 is coupled to the input end of the analog front end circuit 121. The switch circuit 123 is coupled to same-column electrodes of the sensing electrodes in the same column of the touch panel 110, as shown in FIG. 8. In the first period (i.e., the period of the self-capacitance touch detection), the switch circuit 123 couples the same-column electrodes to the input end of the analog front end circuit 121 by turns. Accordingly, the analog front end circuit 121 may perform the self-capacitance touch detection on the same-column electrodes in a time-sharing fashion. In the second period (i.e., the period of the mutual-capacitance touch detection), the switch circuit 123 couples the same-column electrodes to the input end of the analog front end circuit 121 at the same time. Accordingly, the analog front end circuit 121 may perform the mutual-capacitance touch detection on the same-column electrodes.

In the embodiment shown in FIG. 8, the analog front end circuit 121 includes the operational amplifier 121_1 and the capacitor 121_2. The operational amplifier 121_1 has the inverting input end, the non-inverting input end, and the output end. The non-inverting input end of the operational amplifier 121_1 is coupled to the switch circuit 123. The first end and the second end of the capacitor 121_2 are respectively coupled to the inverting input end and the output end of the operational amplifier 121_1. The output end of the operational amplifier 121_1 is coupled to the input end of the analog-to-digital converter 122. The non-inverting input end of the operational amplifier 121_1 is coupled to the reference voltage $V_{ref}$. In the second period (i.e., the period of the mutual-capacitance touch detection), the reference voltage $V_{ref}$ is a fixed voltage, and the analog front end circuit 121 may perform the mutual-capacitance touch detection on the target sensing electrode (e.g., the sensing electrode 111_4). In the first period (i.e., the period of the self-capacitance touch detection), the reference voltage $V_{ref}$ is a clock signal, and the analog front end circuit 121 may perform the self-capacitance touch detection on the target sensing electrode (e.g., the sensing electrode 111_4).

Through the switch circuit 123, the same-column electrodes are commonly coupled to the input end of the analog front end circuit 121. Accordingly, the touch sensing circuit 120 may obtain the mutual-capacitance detection result of the touch panel 110 within a short period of time (e.g., a cycle). In the embodiment shown in FIG. 8, even though the touch sensing circuit 120 is unable to find out an exact location of the touch event during the period of the mutual-capacitance touch detection, the touch sensing circuit 120 is able to tell whether the touch event occurs on the touch panel 110 within a short period of time (e.g., a cycle) through the mutual-capacitance touch detection, so as to determine whether the touch event is a large-area touch event triggered by the water 31. Once it is determined that the large-area touch event is a touch event triggered by the water 31, when the user is in contact with the water 31, the touch sensing circuit 120 may perform the self-capacitance touch detection on the sensing electrodes again to obtain the location of the water 31, and report the location of the water 31 to the processor 130. When the touch sensing circuit 120 determines that the large-area touch event on the touch panel 110 is not triggered by water, the touch sensing circuit 120 may ignore the large-area touch event. In other words, the touch sensing circuit 120 may refrain itself from reporting the location of the large-area touch event to the processor 130.

It should be noted that, in different scenarios of application, relevant functions of the touch sensing circuit 120 and/or the processor 130 may be implemented as software, firmware, or hardware in a conventional programming language (e.g., C or C++), a conventional hardware description language (e.g., Verilog HDL, or VHDL), or other suitable programming languages. The programming languages capable of executing the relevant functions may be deployed as any known computer-accessible media, such as magnetic tapes, semiconductor memories, magnetic disks, and compact disks (e.g., CD-ROM or DVD-ROM), or the programming languages may be transmitted through the Internet, wired communication, wireless communication, or other communication media. The programming languages may be stored in an accessible medium of a computer for a processor of the computer to access/execute programming codes of the software (firmware). In terms of hardware implementation, various logical blocks, modules, and circuits in one or more controllers, microcontrollers, microprocessors, application-specific integrated circuits (ASICs), digital signal processors (DSPs), field programmable gate arrays (FPGAs), and/or other processors may be used to implement or execute the functions described in the embodiments of the invention. In addition, the apparatus and method according to the embodiments of the invention may be implemented through combining the hardware and the software.

In view of the foregoing, in the touch apparatus 100, the sensing method of the touch apparatus 100, and the touch sensing circuit 120 of the touch apparatus 100 according to the embodiments of the invention, the self-capacitance touch detection and the mutual-capacitance touch detection are performed on the sensing electrodes of the touch panel 110. Based on the mutual-capacitance detection result and the self-capacitance detection result, the touch sensing circuit 120 may determine whether the touch event on the touch panel 110 is triggered by water. Consequently, the large-area touch event triggered by the wet finger 30 is not misidentified as a large-area touch event triggered by an erroneous touch.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch apparatus, comprising:
   a touch panel, having a plurality of sensing electrodes to sense a touch event; and
   a touch sensing circuit, coupled to the touch panel to read sensing information of the sensing electrodes, comprising:
   an analog front end circuit;
   a switch circuit, directly connected to an input end of the analog front end circuit, and coupled to a plurality of same-column electrodes of the sensing electrodes in the same column,
   wherein:
   in a first period, the switch circuit couples the same-column electrodes to the input end of the analog front end circuit by turns such that the analog front end circuit performs self-capacitance touch detection on the same-column electrodes in a time division manner, the touch sensing circuit applies a same driving signal to the sensing electrodes at the same time, and the touch sensing circuit performs the self-capacitance touch detection on the sensing electrodes to obtain a self-capacitance detection result, and
   in a second period, the touch sensing circuit performs the mutual-capacitance touch detection on one target sensing electrode of the same-column electrodes to obtain a mutual-capacitance detection result, wherein in the mutual-capacitance touch detection, only the target sensing electrode is coupled to the analog front end circuit of the touch sensing circuit, and a driving signal is applied to the rest of the same-column electrodes, and
   the touch sensing circuit determines whether the touch event is triggered by water based on the mutual-capacitance detection result and the self-capacitance detection result,
   wherein the touch sensing circuit determining whether the touch event is triggered by the water further comprises:
   having determined that the touch event is triggered by the water, the touch sensing circuit simultaneously applies the same driving signal to the sensing electrodes and performs the self-capacitance touch detection on the sensing electrodes to obtain a location of the water.

2. The touch apparatus as claimed in claim 1, wherein the touch panel is an in-cell touch display panel, and the sensing electrodes are a plurality of common electrodes in the in-cell touch display panel.

3. The touch apparatus as claimed in claim 1, wherein the touch sensing circuit determines that the touch event is triggered by the water when the mutual-capacitance detection result indicates that the touch event occurs on the touch panel, but the self-capacitance detection result indicates that the touch event does not occur on the touch panel.

4. The touch apparatus as claimed in claim 3, wherein the touch sensing circuit reports the location of the water to a processor.

5. The touch apparatus as claimed in claim 1, wherein the analog front end circuit comprises:
   an operational amplifier, having an inverting input end, a non-inverting input end and an output end, wherein the inverting input end is coupled to the switch circuit, and the non-inverting input end is coupled to a reference voltage; and
   a capacitor, having a first end and a second end respectively coupled to the inverting input end and the output end of the operational amplifier.

6. The touch apparatus as claimed in claim 5, wherein the reference voltage is a clock signal in the first period, and the reference voltage is a fixed voltage in the second period.

7. A sensing method of a touch apparatus, comprising:
   providing a touch panel to sense a touch event;
   coupling a plurality of same-column electrodes to an input end of an analog front end circuit by turns by a switch circuit that is directly connected to the analog front end circuit such that the analog front end circuit performs self-capacitance touch detection on the same-column electrodes in a time division manner, and applying a same driving signal to a plurality of sensing electrodes of the touch panel at the same time by a touch sensing circuit and performing the self-capacitance touch detection on the sensing electrodes to obtain a self-capacitance detection result in a first period;
   performing the mutual-capacitance touch detection on one target sensing electrode of the same-column electrodes by the touch sensing circuit to obtain a mutual-capacitance detection result in a second period, wherein in the mutual-capacitance touch detection, only the target sensing electrode is coupled to the analog front end circuit of the touch sensing circuit, and a driving signal is applied to the rest of the same-column electrodes;
   determining whether the touch event is triggered by water by the touch sensing circuit based on the mutual-capacitance detection result and the self-capacitance detection result; and
   when determining that the touch event is triggered by the water, applying the same driving signal to the sensing electrodes, and performing the self-capacitance touch detection on the sensing electrodes to obtain a location of the water by the touch sensing circuit.

8. The sensing method as claimed in claim 7, wherein the touch panel is an in-cell touch display panel, and the sensing electrodes are a plurality of common electrodes in the in-cell touch display panel.

9. The sensing method as claimed in claim 7, wherein the touch sensing circuit determines that the touch event is triggered by the water when the mutual-capacitance detection result indicates that the touch event occurs on the touch panel, but the self-capacitance detection result indicates that the touch event does not occur on the touch panel.

10. The sensing method as claimed in claim 9, further comprising:
reporting the location of the water to a processor.

11. A touch sensing circuit for reading sensing information of a plurality of sensing electrodes of a touch panel, comprising:
an analog front end circuit; and
a switch circuit, directly connected to an input end of the analog front end circuit, and coupled to a plurality of same-column electrodes of the sensing electrodes in the same column,
wherein:
in a first period, the switch circuit couples the same-column electrodes to the input end of the analog front end circuit by turns such that the analog front end circuit performs self-capacitance touch detection on the same-column electrodes in a time division manner, the touch sensing circuit applies a same driving signal to the sensing electrodes at the same time and performs the self-capacitance touch detection on the sensing electrodes to obtain a self-capacitance detection result,
in a second period, the touch sensing circuit performs the mutual-capacitance touch detection on one target sensing electrode of the same-column electrodes to obtain a mutual-capacitance detection result, wherein in the mutual-capacitance touch detection, only the target sensing electrode is coupled to the analog front end circuit of the touch sensing circuit, and a driving signal is applied to the rest of the same-column electrodes, and
the touch sensing circuit determines whether a touch event of the touch panel is triggered by water based on the mutual-capacitance detection result and the self-capacitance detection result, and
wherein the touch sensing circuit determining whether the touch event is triggered by the water further comprises:
having determined that the touch event is triggered by the water, the touch sensing circuit simultaneously applies the same driving signal to the sensing electrodes and performs the self-capacitance touch detection on the sensing electrodes to obtain a location of the water.

12. The touch sensing circuit as claimed in claim 11, wherein the touch sensing circuit determines that the touch event is triggered by the water when the mutual-capacitance detection result indicates that the touch event occurs on the touch panel, but the self-capacitance detection result indicates that the touch event does not occur on the touch panel.

13. The touch sensing circuit as claimed in claim 12, wherein the touching sensing circuit reports the location of the water to a processor.

14. The touch sensing circuit as claimed in claim 11, wherein the analog front end circuit comprises:
an operational amplifier, having an inverting input end, a non-inverting input end and an output end, wherein the inverting input end is coupled to the switch circuit, and the non-inverting input end is coupled to a reference voltage; and
a capacitor, having a first end and a second end respectively coupled to the inverting input end and the output end of the operational amplifier.

15. The touch sensing circuit as claimed in claim 14, wherein the reference voltage is a clock signal in the first period, and the reference voltage is a fixed voltage in the second period.

* * * * *